United States Patent [19]

Vinciguerra et al.

[11] Patent Number: 4,546,953
[45] Date of Patent: Oct. 15, 1985

[54] BALL VALVE

[75] Inventors: Costantino Vinciguerra, Florence, Italy; Jean Lephilibert, Levallois-Perret, France

[73] Assignees: Nuovo Pignone S.p.A., Florence, Italy; Schlumberger Industrie S.A., Montrouge, France

[21] Appl. No.: 881,593

[22] Filed: Feb. 27, 1978

[30] Foreign Application Priority Data

Mar. 10, 1977 [IT] Italy .................................. 21123

[51] Int. Cl.⁴ .......................................... F16K 31/12
[52] U.S. Cl. .................................. 251/58; 251/162; 251/163
[58] Field of Search ..................... 251/163, 162, 58

[56] References Cited

U.S. PATENT DOCUMENTS

| | | | |
|---|---|---|---|
| 2,623,395 | 12/1952 | White | 251/163 X |
| 2,934,310 | 4/1960 | Kinney | 251/163 |
| 3,675,894 | 7/1972 | Friedell | 251/163 |
| 3,843,090 | 10/1974 | Schneider | 251/163 X |
| 4,013,264 | 3/1977 | Friedell | 251/162 X |

FOREIGN PATENT DOCUMENTS 657137  2/1938  Fed. Rep. of Germany ...... 251/163

Primary Examiner—Harold W. Weakley
Attorney, Agent, or Firm—Hedman, Gibson, Costigan & Hoare

[57] ABSTRACT

An improved ball valve is disclosed, which is particularly adapted for use with pipelines of large diameter, possibly of the kind intended to convey toxic or dangerous fluids and for which a virtually perfect seal is required, said valve having a control mechanism which comprises sequentially acting linkages and preloaded resilient means in order that the valve shutter is always in an accurate central position as to its axis of rotation and the approach of the shutter to the seat takes place only once that the rotation of 90° has been completed, in order that a uniform and intense pressural action of the shutter on the seat may be obtained. Alternative embodiments within the scope of the invention are shown and described.

4 Claims, 9 Drawing Figures

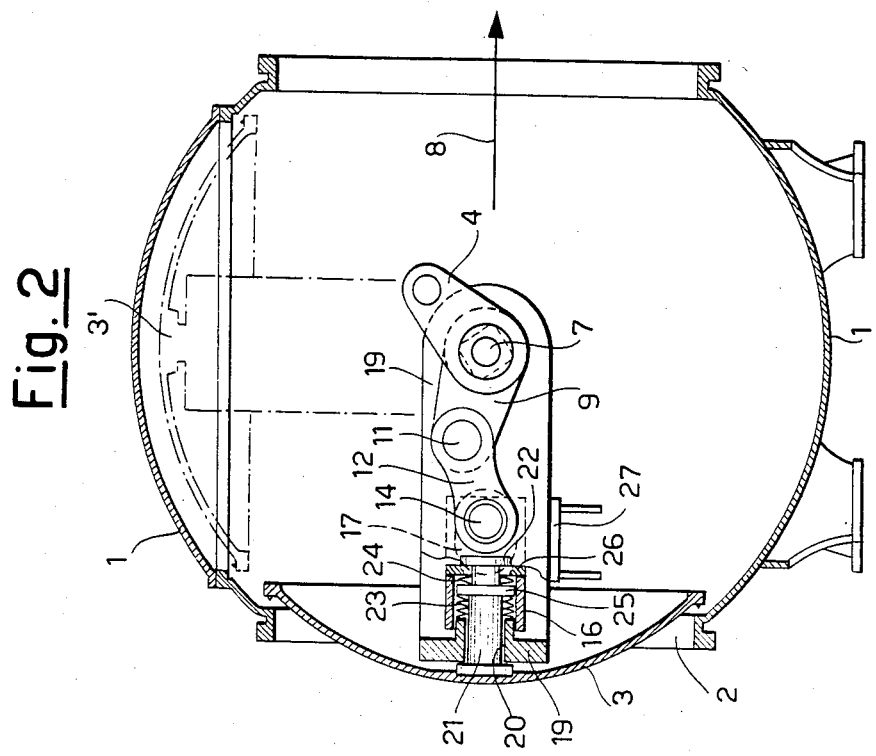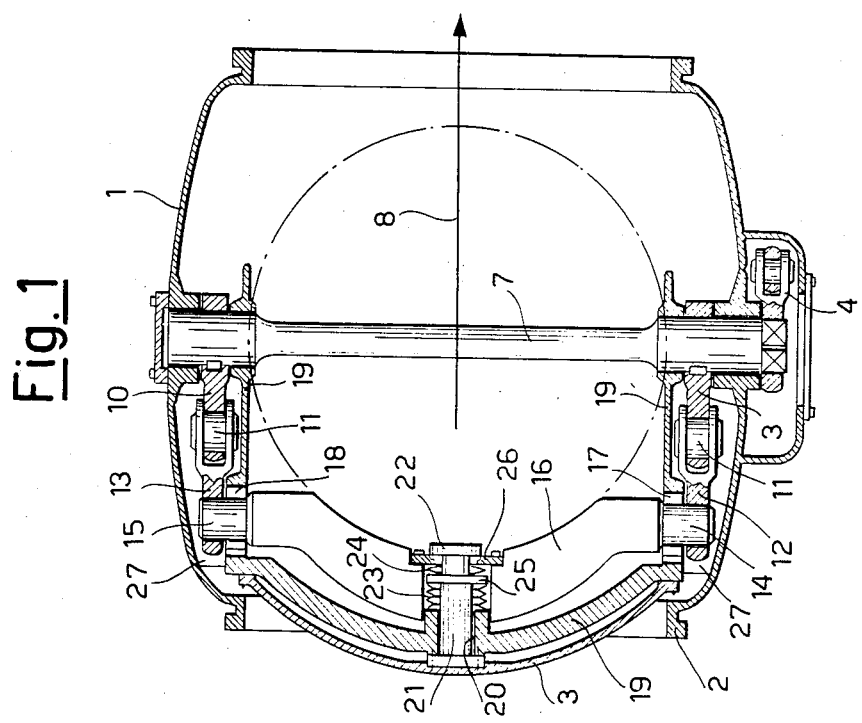

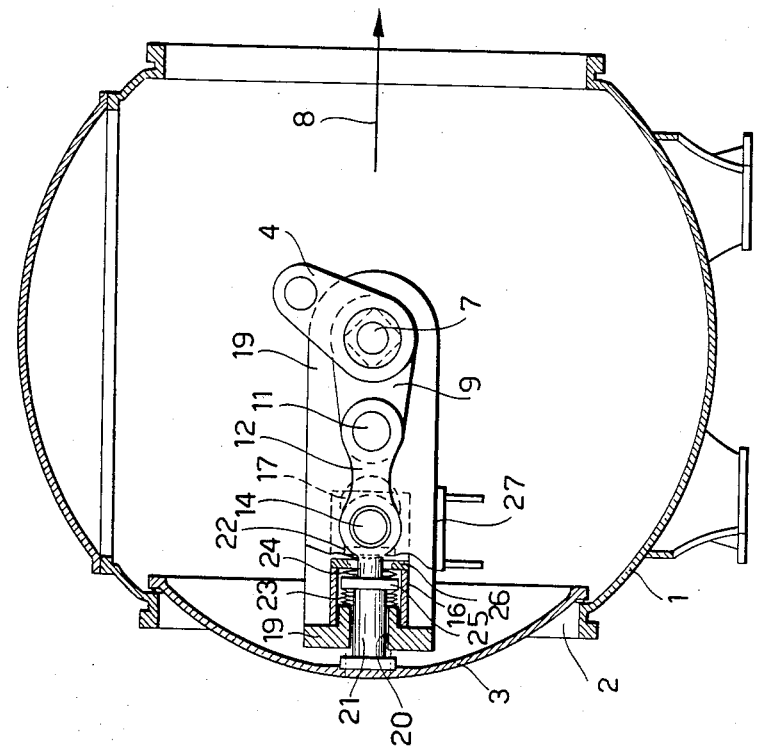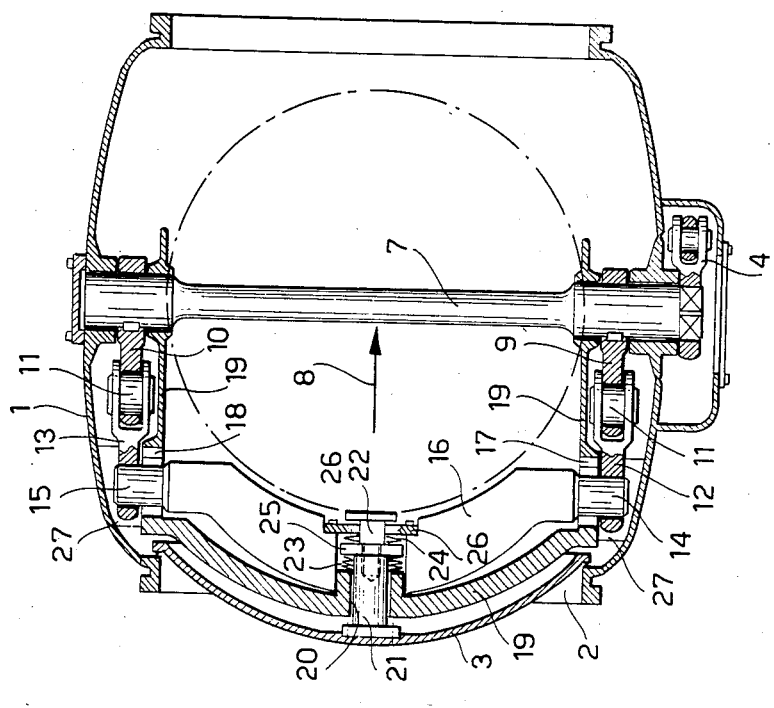

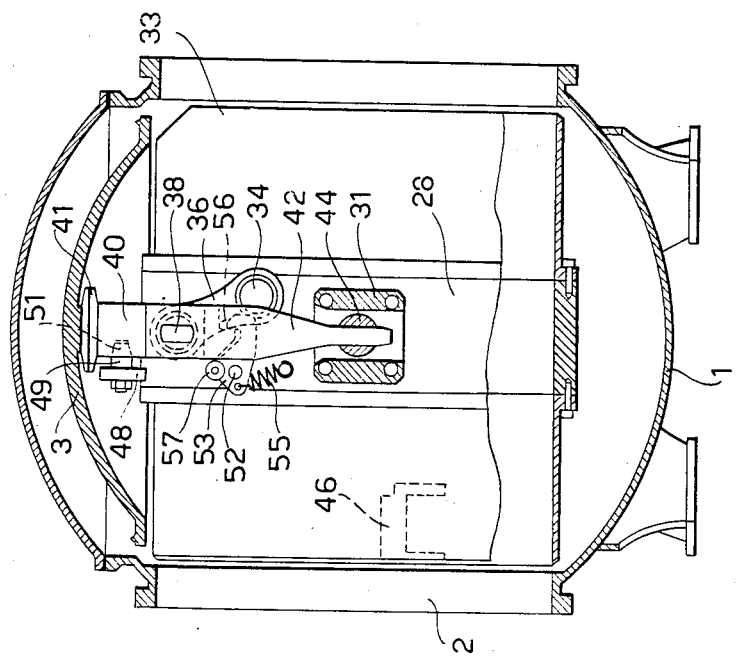
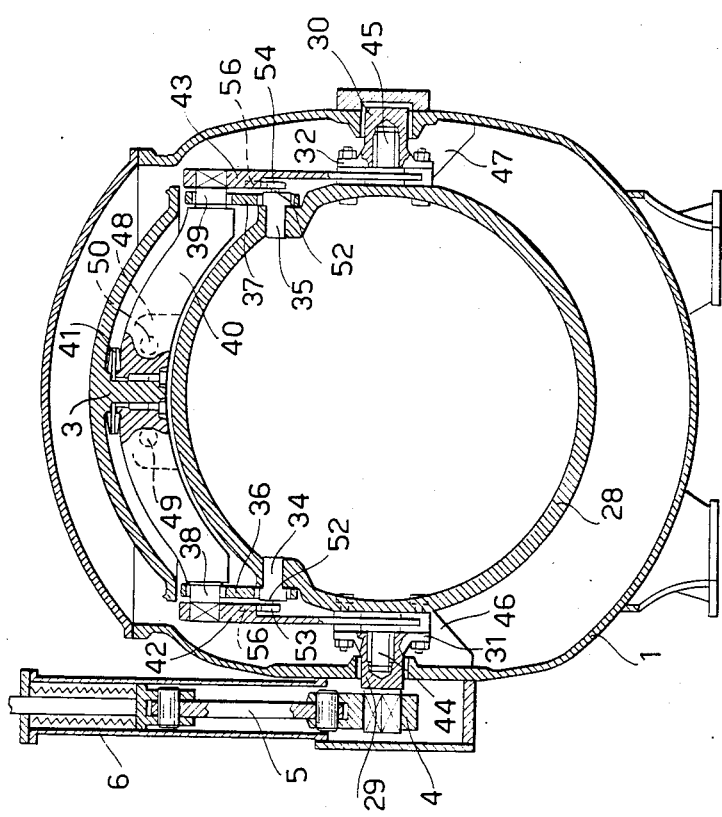

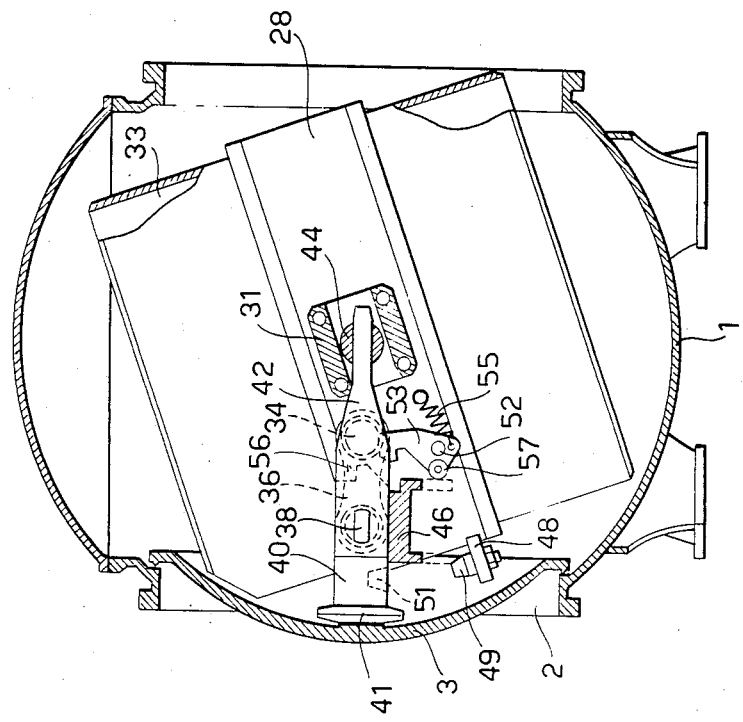
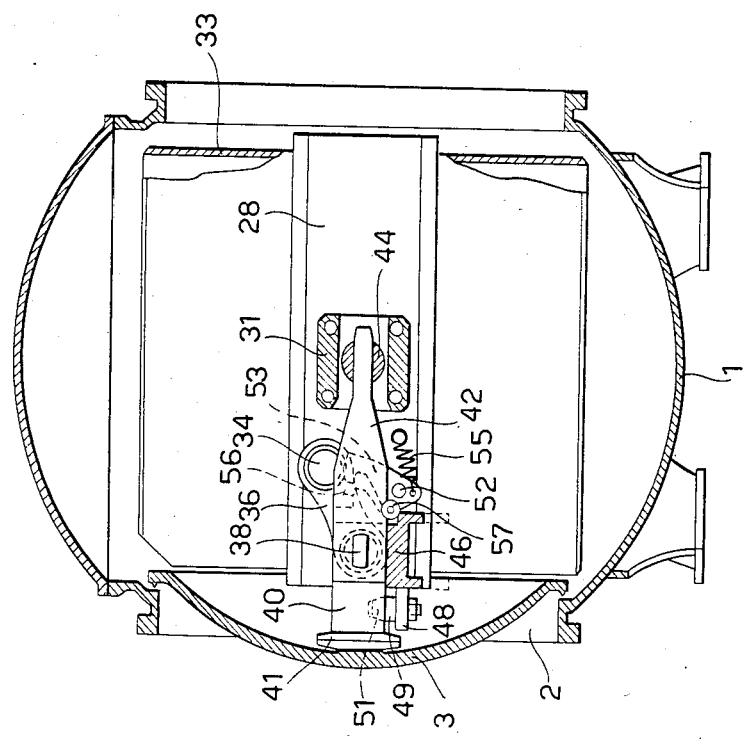

BALL VALVE

This invention relates to a ball valve of an improved type, having one or two shutter members, for stopping the flow in large-diameter pipings, in which the closure is effected by a twofold movement of the shutter(s), said movement being composed of a 90-degree rotation about the axle of the ball which is perpendicular to the axis of the stream and a subsequent advance towards the seat.

More detailedly, the invention relates to a novel type of linkage which effects both these movements of the shutter(s) and which thus permits the achievement of a fully satisfactory seal when the valve is closed.

The state of the art has already disclosed a number of types of ball valves, but all of these types of conventional make use, for moving the shutter(s), of linkages which are both extremely intricate in construction and unreliable in operation.

According to a conventional embodiment, in fact, independent members are provided for effecting the shutter rotation step and that of final advance, and the latter step is performed by two intricate systems which are equal to one another and act resiliently upon both sides of the shutter rotation axle and shift said axle of rotation towards the valve seat.

It is apparent, now, that such an approach cannot absolutely afford a uniform pressure of the shutter against its seat so that the achievement of a full seal is at least questionable.

According to another known approach, moreover, a single linkage is adopted for effecting both movements of the shutter, the seal being entrusted to the elastic deformation of two flexible arms; these are affixed to the sides of the shutter and mounted eccentrically on the rotation shaft, to press the shutter during the rotation of the latter, within guideways provided in the seat in cooperation with a thrust member which causes the shutter to be tilted forward.

However, not even the latter approach is such as to provide an even pressure of the shutter against its seat and, in addition, due to the continuous elastic deformations to which the two flexible arms are subjected, an adequately long and satisfactory service life of the valve is not warranted at all.

An object of this invention is to do away with such shortcomings by providing a ball valve in which both the movements of the shutter are effected by a single simple and reliable linkage which ensures the obtaining and the maintenance of a perfect seal in spite of the lapse of time.

This object is achieved, according to a feature of the invention, by a shutter which is resiliently connected to a yoke, the two ends of which are hinged to two levers which embody a toggle system with two cranks integrally fulcrumed to the two sides of an internal rotation shaft, the latter being arranged perpendicularly to the direction of the flow and rotated by a servomotor with the intermediary of a leverage system placed laterally and externally of the valve body, said yoke having its ends inserted in straight guideways formed in a rigid guiding structure having substantially the shape of a U and mounted idly on said internal rotation shaft, said guiding structure supporting the shutter, the central hub of which is inserted in a bore formed in correspondence with the axis of symmetry of such U-shaped structure and the rotation of said hub is confined to an angle of 90 degrees by arresting planes which are supported by the valve body aforesaid.

By so doing, in fact, a first 90-degree rotation of the internal rotation shaft, as obtained through said servomotor, entails a like rotation of the assembly shutter-yoke-guiding structure and brings the shutter in confronting relationship with its seat while the guiding structure goes to abut said arresting planes. At this stage, an additional rotation of the shaft, still by the instrumentality of the servomotor, will involve only a straightening of the toggle systems formed by two connecting rods and two cranks since the assembly shutter-yoke-guiding structure cannot be rotated due to the presence of the arresting planes, so that the yoke will be pushed forward and the same shutter will do and will rest pressurally against its seat. On the other hand, since the forward movement of the yoke and the shutter is guided by the rectilinear guideways of the rigid guiding structure which is idly mounted on the internal rotation shaft, it is warranted that the displacements of the shutter will always take place in the radial direction, that is to say in such a way that the central axis of the shutter will always contain the center of the valve and the shutter is always centered relative to its seat, just as must be in order that an efficient seal may be achieved.

Definitely, a feature of the present invention is the fact that the linkage for the rotation of the shutter and the subsequent advance thereof towards its scat is formed by an internal rotation shaft, arranged perpendicularly to the direction of the stream to be stopped and rotated by a servomotor through a system of leverages placed laterally and externally of the valve body, at both sides of which are affixed two cranks which make up a toggle assembly with two levers which are respectively fulcrumed to the two ends of a yoke and are inserted in rectilinear guideways borne by a rigid guiding structure shaped substantially in the form of a U, said structure being mounted idly on the internal rotation shaft and supports the shutter: the central hub of the shutter is inserted in a bore formed in registry with the axis of symmetry of the U-shaped structure and is resiliently connected with said yoke, the rotation of the rigid guiding structure being limited to an angle of 90 degrees by arresting planes which are supported by the valve body aforesaid.

According to another feature of the present invention, the central hub and thus the shutter, are resiliently connected to the yoke by two preloaded cup spring systems, the first system acting between the rigid guiding structure and a projection of the hub, the second system acting between said projection and said yoke to which the hub is movably and axially connected by a through-screw, said second spring system being preloaded to a preselected sealing value while the first spring system is preloaded to a lighter value.

By so doing, the twofold result is achieved that, in the valve-opening stage, both spring systems withdraw the shutter from its seat and automatically restore the angle between the cranks and the connecting rods of the two toggle systems, whereas the tight seal of the valve is obtained with a first stage of approach of the shutter to its seat via the comparatively small force applied by the first spring system and a subsequent stage of sealing proper through the preselected intense force as displayed by said second spring system.

Actually, as the two toggle systems are straightened and thrust both the yoke and the shutter forward, the spring of the first system is compressed at the outset, whereby the shutter is pressed against its seat with a comparatively small force and this fact makes possible the setting movements, if any, of the shutter on the seat, and only thereafter the spring of the second spring system is compressed and transfers the preselected load by which the shutter must be pressed against the seat to achieve the desired sealing force.

However, in the embodiment as described hereinbefore, the ball valve is always fitted with an internal rotation shaft which, when the valve is open, dips in the flowing stream.

Since the existence of such a shaft might originate in certain cases pressure drops which are inadmissible, in order to effect such a shortcoming and according to a characteristic modification of the present invention, the linkage for the rotation of the shutter and the subsequent advance thereof towards its seat, is composed of an annular structure which is pivoted to the valve body by the agency of two diametrically opposite rotation pins, either of which is controlled by the servomotor aforementioned, the annular structure having pivoted thereon, eccentrically relative to the rotation pins, two connecting rods the heads of which are, respectively, pivoted to the end of a yoke which centrally bears the shutter through a cup-spring system, the yoke ends being, in addition, integral with two guiding arms which are inserted in a groove of two grooved pins which are idly supported by said rotation pins, respectively, and the rotations of which are limited to an angle of 90 degrees by arresting planes supported by the valve body.

It is apparent that such a linkage is substantially akin to that described hereinabove, As a matter of fact, also in this case, there is a double toggle-system formed by two connecting rods and by two cranks, but now the two cranks are an entity with the annular structure aforesaid and the toggle effect is provided by the eccentrical pivoting of the two connecting rods. In addition, even if the rigid guiding structure has been omitted, also in this case the yoke and thus the shutter must always be displaced radially, their axis of symmetry being always maintained as passing through the valve center by virtue of the action exerted by the guiding arms.

However, the absence of a rigid guiding structure in the valve embodiment just now described, by its permitting relative movements of the yoke-shutter assembly with respect to the annular structure, may originate, during the open-valve operation or during the closing stage, that is when the shutter is being rotated, detrimental vibrations of the yoke-shutter assembly.

In order that such a drawback may be offset and that any movement of the yoke-shutter assembly may be prevented prior that the shutter has brought about the sealing action, and thus, summing up, in order to lock the yoke-shutter assembly to the annular structure in the open-valve situation and during the closing stage, according to another modification of the present invention, such an annular structure is equipped with two conical latching dowels which are inserted into corresponding seats formed through said yoke, the unlatching taking place spontaneously as a result of the valve-closing operation itself.

As a matter of fact, as soon as, upon a 90-degree rotation of the annular structure, the guiding arms integral with the yoke abutthe respective arresting planes and cannot consequently be rotated any wider, the further rotation of the annular structure to straighten the levers of the toggle systems and thus to effect the valve-closing step, will do nothing else than automatically unlatching the conical dowels integral with the annular structure which rotates from the seats to the yoke, the latter remaining at standstill, so that the yoke itself is disengaged.

Moreover, in order to improve the latching of the yoke-shutter assembly to the annular structure still better in the open-valve operation and during the closing stage, according to a further characteristic of the present invention, there are pivoted onto the annular structure two gripping hooks which are respectively urged by recoiling springs towards becoming hooked to gripping planes tendered by the guiding arms, the hooks being equipped with rolling followers which cooperate with the arresting planes, respectively, for releasing said hooks.

Lastly, it must be borne in mind that, in order that the pressure drops of the valve may be further reduced, the annular structure can be affixed to a pipe section which is, when the valve is open, an extension of the pipeline in the valve interior, so that the fluid fillets undergo no deflection at all. On the other hand, it is likewise apparent that the invention can be applied also to a ball-valve having two shutters, it being only necessary to adopt two linkages of the kind referred to above to actuate both shutters.

The invention is now better illustrated with reference to the accompanying drawings which show preferential embodiments of a practical nature which have been indicated by way of example only and without any limitation: technical or constructional modifications and changes may be introduced without departing from the scope of the invention.

In the drawings:

FIG. 1 shows a cross-sectional view from the top of a ball valve according to the invention in its closing stage, that is, with the shutter which has already been rotated through 90° and thus in confronting relationship with its seat.

FIG. 2 is a lateral cross-sectional view of the ball valve of FIG. 1, in which the position taken by the shutter when the valve is open is indicated in phantom.

FIG. 3 is a cross-sectional top view similar to that of FIG. 1, but in which the shutter is pressed against its seat in order to provide the sealing action.

FIG. 4 shows a lateral cross-sectional view of the ball valve of FIG. 3.

FIG. 5 shows a front cross-sectional view of a ball valve according to a modification of the invention, with the shutter in the open-valve position.

FIG. 6 shows a lateral cross-sectional view of the ball valve of FIG. 5.

FIG. 7 shows a lateral cross-sectional view akin to that of FIG. 6, but with the shutter in the closing stage, that is, already rotated through 90° and thus confronting its seat.

FIG. 8 is a lateral cross-sectional view similar to that of FIG. 7, but when the closing step has already been completed and the shutter is pressed against its seat.

Figure 9:
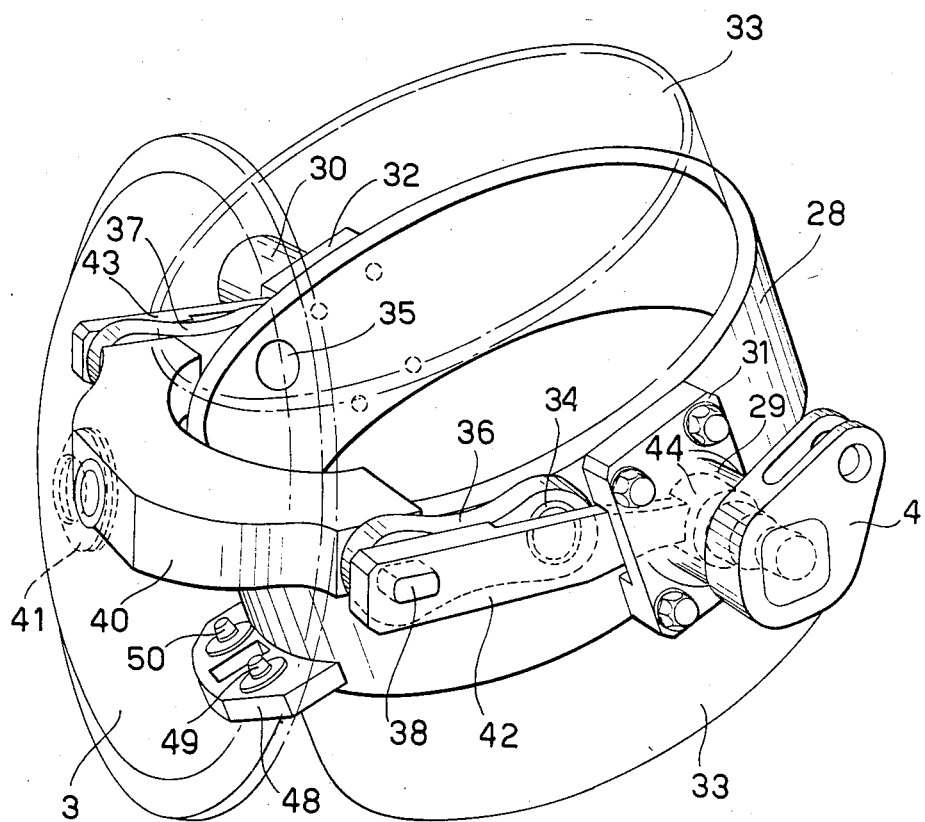
FIG. 9 shows a perspective closeup view of the shutter-actuating linkage according to a modification of the invention.

Having now reference to the drawings, in which like members are connoted by like numerals, at 1 is shown the spherical valve body, at 2 the seat for a shutter 3, and at 4 a lever which, installed laterally and externally of the valve body 1 on the rotation member of the shutter 3, is intended to transfer to the rotation member, via a connecting rod 5, the drive of a servo-motor 6 (best seen in FIG. 5).

Now, the linkage for the rotation of the shutter 3 and for the subsequent advance of the latter towards its seat 2, comprises, according to the invention, an internal rotation shaft 7 (best seen in FIGS. 1 to 4) which, arranged perpendicularly to the direction of flow 8, is supported for rotation by the valve body 1 and, emerging by either end from the valve body, is made fast to the lever 4. At the two ends of the shaft there are, solidly therewith, two cranks 9 and 10 and these are pivoted by two respective pins 11 to two levers 12 and 13. Levers 12 and 13, in their turn, are pivoted to the ends 14 and 15, of a yoke 16. The two cranks 9 and 10 and the respective levers 12 and 13 are arranged at an angle relative to one another (best seen in FIG. 2) so as to make up a toggle system.

On the other hand, the two ends 14 and 15 of the yoke 16 are inserted, respectively, in rectilinear guideways 17 and 18 formed on the wings of a rigid guiding structure 19: the latter has substantially the shape of a U and is idly mounted on the internal rotation shaft 7.

The rigid structure 19, has, in addition and in correspondence with its axis of symmetry, a bore 20 within which the central hub 21 of the shutter 3 is inserted for being supported thereby. Hub 21 is resiliently connected to the yoke 16 by the through-screw 22 and the two cup spring systems 23 and 24, the springs of which are preloaded: more detailedly, the first system 23 is preloaded at a comparatively low load, is caused to act between the rigid guiding structure 19 and an embossment 25 on hub 21, and the second spring system 24: is pre-loaded, conversely, to the preselected value of the seaming pressure and acts between the embossment 25 and a shoulder 26, integral with the yoke 16.

Eventually, the rotation of 19 about the shaft 7 and thus the rotation of 16 and the shutter 3, are limited to an angle of 90° by arresting planes 27 which are borne by the valve body 1: thus there is the assurance that the shutter 3, when the valve is open, lies in the position shown in phantom at 3' in FIG. 2 and is always perfectly centered, during its rotation, relatively to its seat 2.

According to the modification of the invention shown in FIGS. from 5 to 9 inclusive, conversely, the linkage is composed by an annular structure 28, which is supported for rotation by the valve body 1, through the two rotation pins 29 and 30: these are fastened to the grooved blocks 31 and 32, respectively, and the latter blocks are screwably affixed to the annular structure 28 in central and diametrically opposite locations. In the drawings the annular structure 28 is shown integral with a pipe section 33. Section 33 is, when the valve is open, nothing but an extension of the pipeline concerned in the valve interior, as best seen in FIG. 6. In addition, the rotation pin 29, is fastened to the lever 4 aforementioned. To the annular structure 28 are then pivoted, eccentrically relative to the rotation pins 29 and 30, by the agency of the pivots 34 and 35, respectively, two connecting rods 36 and 37: these are hinged to the ends 38 and 39, respectively, of a yoke 40 which centrally bears the shutter 3 with the intermediary of a system of cup springs 41. The ends 38 and 39 of the yoke 40, moreover, are made integral with either end of two guiding blocks 42 and 43, respectively: the other ends of the blocks are tapered and pass through the grooves of the grooved blocks 31 and 32 and are inserted into, and remain in, the grooves of two grooved pins 44 and 45, respectively: these are supported for rotation in the interior of the blocks 31 and 32 in a position which is coaxial with the rotation pins 29 and 30. On the other hand, the rotation of the guiding arms 42 and 43 and thus also that of the yoke-shutter assembly integral with such arms, is limited to an angle of 90° by arresting planes 46 and 47, the latter being supported by the valve body 1. The annular structure 28 has, furthermore, a cantilevering plate 48 to which two conical latching dowels, 49 and 50, are affixed: these are inserted in corresponding seats 51 formed through the yoke 40. Unlatching takes place automatically as can be both seen and clearly understood in FIG. 8. Lastly, to the annular structure 28 are also pivoted, via pins 52, two gripping hooks, 53 and 54; these are biased by recoil springs 55 to become hooked to gripping planes 56 as borne by the guiding arms 42 and 43.

The gripping hooks 53 and 54 are also equipped with rolling followers 57 which cooperate with their respective arresting planes 46 and 47 to release the hooks 53 and 54: all this can clearly be seen in FIGS. 7 and 8.

I claim:

1. A ball valve for cutting off the flow in a pipe line of a large diameter having a spherical body, a valve seat and a shutter movable to and from said seat, wherein said movement includes rotation of the shutter about the axis of the valve and subsequent radial movement to and from its seat, comprising:
   a yoke within said valve body centrally supporting said shutter through a spring mechanism which is rotatable with the shutter,
   an annular structure pivoted to and within the valve body by opposing rotatable pins supported by the valve body,
   a pair of opposing connecting rods carried by and pivoted eccentrically to said annular structure relative to said rotatable pins wherein each of said rods has a head pivotally connected to an end of said yoke,
   a pair of opposing pins having grooves therein which are supported idly by said rotatable pins,
   a pair of opposing guide arms each of which has one end inserted in a groove of said grooved pins and the other end thereof coupled to an end of said yoke,
   a pair of opposing arresting planes within and supported by the valve body to limit the rotation of said guide arms to 90° in moving the shutter to its seat,
   latching means on said annular structure releasably engaged by said yoke to keep the rotation of said shutter, yoke and guide arms assembly in unison until the shutter is in a confronting relationship to its seat as said guide arms abut said arresting planes, whereupon further rotation of said rotatable pins and said annular structure causes said eccentrically pivoted connecting rods to straighten and advance the shutter against its seat, and
   a servomotor connected to one of said rotatable pins for rotation and radial movement of the shutter to and from the seat through rotation of said rotatable pins.

2. The ball valve of claim 1, wherein said latching means includes a cantilevered plate on said annular structure, a pair of conical dowels supported on said plates, and a pair of correspondingly shaped conical seats in said yoke for engaging said dowels, and wherein the unlatching of said dowels from their seats takes place by virtue of the valve-closing step itself as said guide arms engage said arresting planes and said servomotor continues to rotate said rotatable pins and said annular structure pivoted thereto.

3. The ball valve of claim 1, further comprising a pair of opposing gripping hooks pivotally connected to said annular structure, recoil springs connected to said hooks and said annular structure, gripping planes provided in the said guide arms and into which said hooks are urged by said springs, and rolling followers on said gripping hooks which engage and cooperate with said arresting planes for relieving the hooks from said gripping planes as said guide arms are brought into contact with said arresting planes.

4. The ball valve of claim 1, further comprising a pipe section within the valve body affixed to said annular structure which is open when the shutter is open to minimize the pressure drop of the fluid flowing through the valve.

* * * * *